Feb. 14, 1933.  N. D. PARKS  1,897,491
PICK-UP FEEDER FOR HARVESTERS
Filed Sept. 26, 1927  2 Sheets-Sheet 1
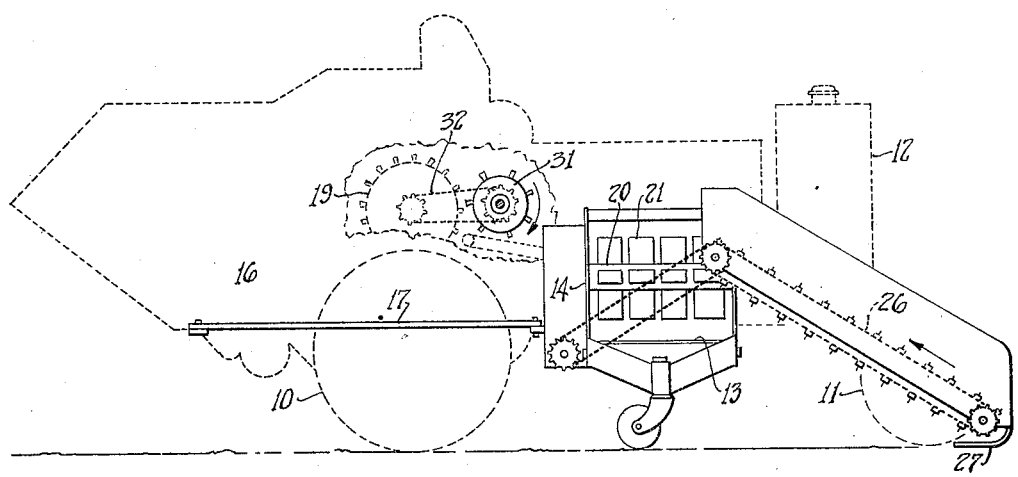
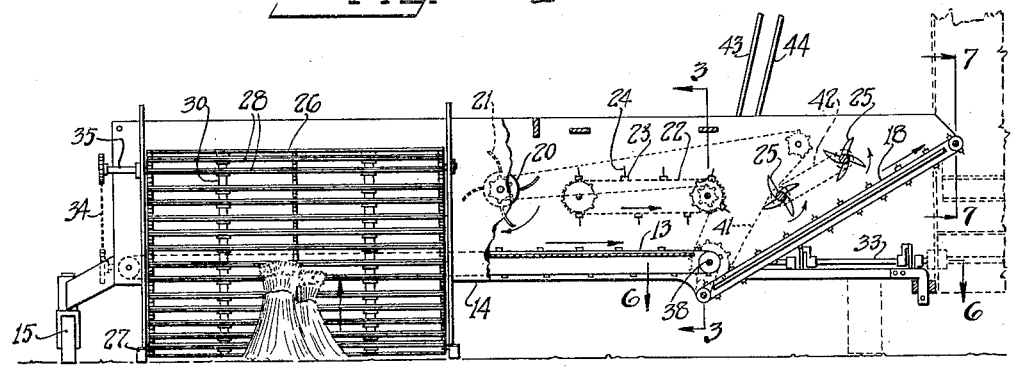
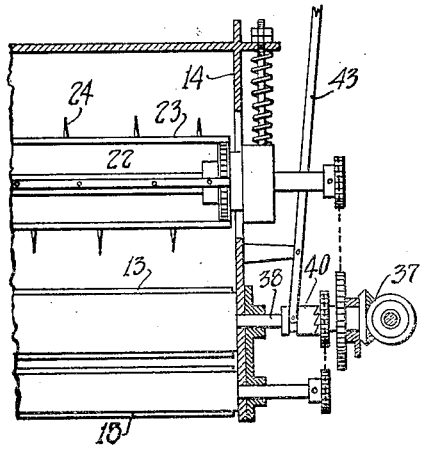
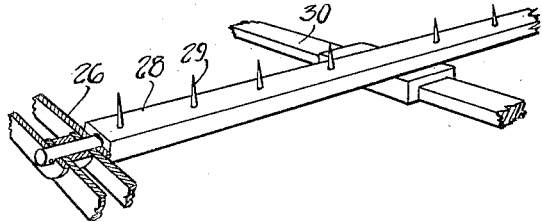
INVENTOR
N. D. Parks
BY C. B. Birkenbeuel.
ATTORNEY

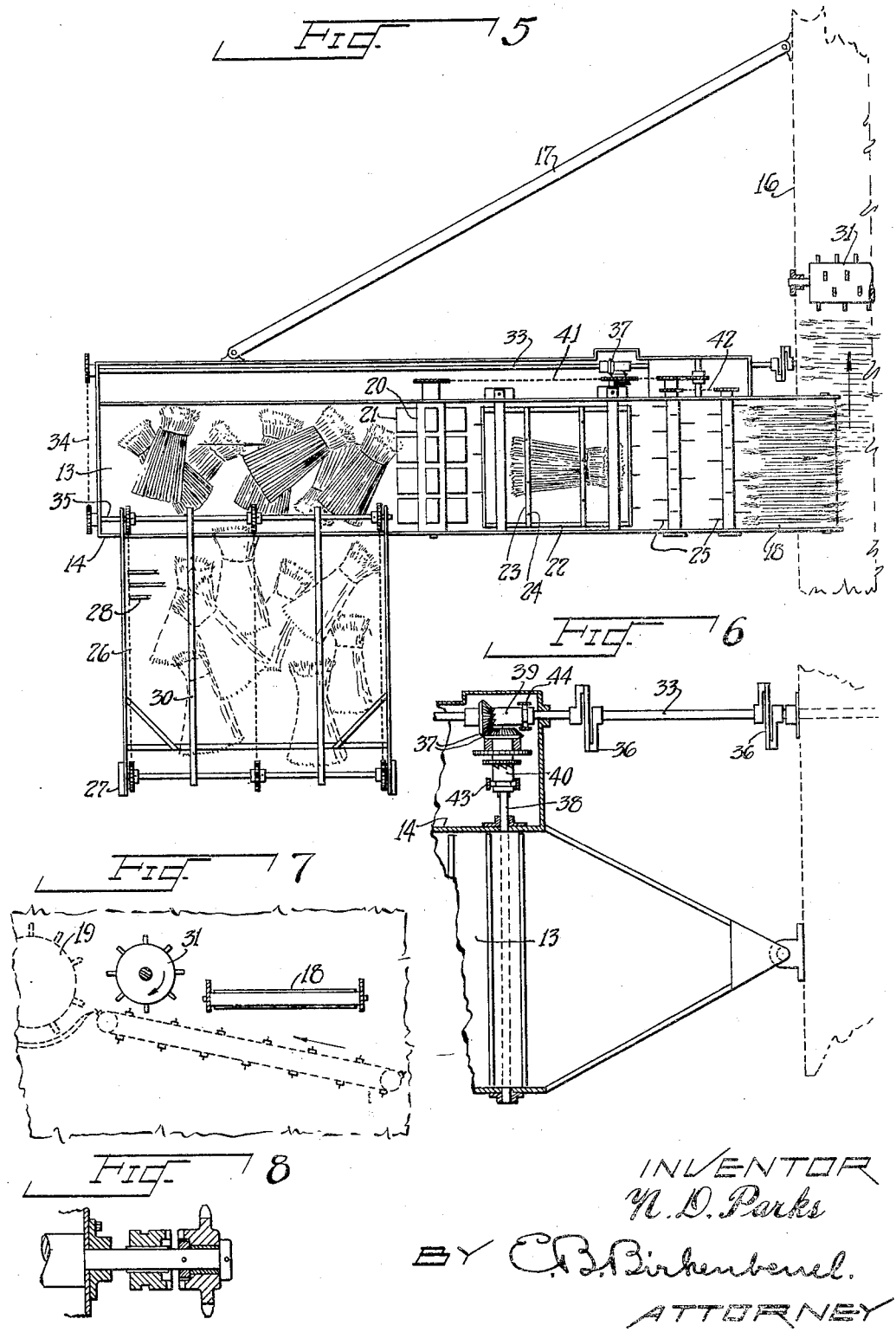

Patented Feb. 14, 1933

1,897,491

UNITED STATES PATENT OFFICE

NELSON D. PARKS, OF PENDLETON, OREGON

PICK-UP FEEDER FOR HARVESTERS

Application filed September 26, 1927. Serial No. 222,037.

This invention relates generally to harvesting machinery, and especially to a pick-up device for bundles to be used in conjunction with a portable threshing machine of the type known as the combined harvester in which bundled grain is taken from the shock and threshed as the machine proceeds.

The main object of this invention is to provide an exceedingly simple and efficient form of pick-up feeder in which the bundles of a shock can be picked up, straightened out and evenly distributed for feeding into the thresher, during which time its bands are cut in order to free the grain in the bundle.

The second object is to so construct the conveyor that, in spite of the fact that all of the bundles in the shock are picked up at practically the same time, they will be retarded in their travel into the machine for the purpose of preventing an over-supply of grain entering the cylinders at one time.

The third object is to accomplish a more uniform feed for the purpose of preventing the loss of grain always accompanying over-feeding or choking of the cylinder.

The fourth object is to cut the bands after the bundles have been straightened out and separated in their travel in order to make one set of bundle cutters sufficient to completely cut all of the bands.

The fifth object is to provide special controls for the various drapers in the form of clutches, in order to enable the operator to have a more complete control over the passage of the grain through the machine.

These, and other objects, are accomplished in the manner set forth in the following specification as illustrated in the accompanying drawings in which:

Figure 1 is a side elevation of a harvester showing the device attached thereto. Figure 2 is a front elevation of the harvester with portions cut away to show intimately related parts. Figure 3 is a vertical section taken along the line 3—3 in Figure 2. Figure 4 is a perspective view of a pick-up conveyor slat showing its spikes and the manner in which it is carried by the chains and also held with its spikes uppermost. Figure 5 is a plan of the attachment. Figure 6 is a horizontal section taken along the line 6—6 in Figure 2. Figure 7 is a section taken along the line 7—7 in Figure 2. Figure 8 illustrates the manner in which the clutches are provided on the various shafts.

Similar numbers of reference refer to similar parts throughout the several views.

Referring in detail to the drawings, there is illustrated the usual high drive wheel 10 of the combined harvester, as well as its front wheels 11 and radiator 12, although it must be understood that the particular type of combine employed is unimportant.

The device itself includes a main draper 13 which is ordinarily horizontal and is carried by the frame 14, which is supported at one end by the caster roller 15, and is braced from the combine frame 16 by a brace member 17. An inclined draper 18 receives the bundles from the main draper 13 and delivers same to the cylinder 19. Over the main draper 13 is mounted a retarder 20 which is a rotatable member provided with spokes or blades 21.

Between the retarder 20 and the cylinder 19 is also mounted a comber 22, which is in the form of a conveyor whose slats 23 are provided with spikes 24. Between the comber 22 and the cylinder 19 and above the inclined draper 18 is mounted a pair of bundle cutters 25. It will be observed that the retarder 20 is so rotated that its blades 21 nearest the draper 13 move in an opposite direction to the draper 13.

On the intake end of the main draper 13, and supported from the frame 14, is a bundle pick-up conveyor 26 whose forward end is supported on the shoes 27. It is preferable to provide the slats 28 with spikes 29 and to provide supports 30 for the slats 28 which will insure the spikes being uppermost while bundles are being carried on their slats.

Immediately in front of the cylinder 19 is placed a straightening cylinder 31 by means of which the final straightening operation is performed. A chain 32 is used to drive the cylinder 31 from the threshing cylinder 19. A longitudinal main shaft 33 extends the length of the frame 14 and from its extreme end, through the chain 34, drives the power shaft 35 of the bundle pick-up conveyor 26. From the shaft 33, which is preferably provided with universal joints 36, a pair of bevel gears 37 drives the countershaft 38. A clutch 39 is interposed in the shaft 33 by means of which the entire pick-up can be controlled. A clutch 40 is interposed in the countershaft 38, which shaft, through the chain 41, drives the bundle cutters 25, which themselves are connected by the chain 42, and also the comber 22 and the retarder 20.

The shaft 38, which forms the drive for the main draper 18, is controlled through the clutch 40, making it possible to stop or retard the travel of the draper 13.

Since the bundle pick-up conveyor 26 is driven from the shaft 33 it follows that if the lever 43, which operates the clutch 40, is moved to the outward position that all of the conveyors 13, 18 and 26 will stop; although the retarders, combers and bundle cutters will continue to operate. Whereas, if the lever 44 on the clutch 39 is moved to an inoperative position, then all of the mechanism, including the drapers, combers, cutters, etc., which form a part of this attachment will cease to operate.

The operation of the machine is as follows: Assuming that the harvester is moved along under its own power, or being drawn by an auxiliary machine, with the pick-up conveyor 26 foremost and the machine being steered so that the pick-up conveyor 26 will come in contact with a shock of grain, the various members of the attachment are now operating and the pick-up conveyor 26 picks up the bundles, usually in topsy turvy fashion, and deposits them on the receiving end of the main draper 13. The pick-up conveyor operates at about one and one-half times the forward speed of the machine; whereas the main draper 13 operates at about machine speed.

The bundles have now fallen upon the main draper and pass at a somewhat reduced speed under the retarding blades 21, which cause the bundles to be spaced apart to prevent bunching and subsequent clogging of the machine. However, as the bundles do find their way along the main draper 13 they encounter the comber 22, which straightens them out so that the straws in the bundle are parallel to their direction of travel, or approximately so. This makes it possible for the bundle cutters 25 to completely sever the bands at one operation, which is highly desirable. This is done while the bundles are proceeding up the inclined conveyor 18. The unthreshed grain is given a final straightening by the cylinder 31 before it enters the threshing cylinder 19, after which the operation is similar to that common in all threshing machines.

It must be understood that machines have long been constructed in which grain is picked up from the windrow, either in bundle form or as it has fallen before the mower. That other machines have been constructed in which entire shocks of grain are picked up and passed through the harvester, but the main difficulty encountered in such machines has been the unevenness of the feeding, the imperfect cutting of the bundle bands, and the inevitable choking of the cylinders, with the accompanying losses of time and grain, as well as the possibility of seriously injuring the machine itself.

In the machine above described a means for receiving a number of bundles of grain into the machine almost simultaneously is provided and a means is then provided for spacing these bundles out and straightening them, after the fashion which they would be fed by an experienced hand feeder, then cutting the bands and again straightening the stalks with the grain still in the head, and introducing it to the threshing cylinder.

In practice, it is found that there are a great many varieties of conditions which must be encountered by the operators of such machines, namely uneven ripening of the grain, varying length of straw, and other conditions to which the machine must accommodate itself.

When the operator sees grain accumulating on the drapers, or encounters an unusually large or heavy shock of grain, he is immediately on the alert and ready to throw out the clutch 40, which will stop or retard the drapers, until he sees that the surplus has been worked away and the cylinder is ready for more grain.

In other words—this mechanism readily adapts the machine for the intermittent and irregular reception of grain in large or small quantities and distributes same at a uniform rate of speed to the threshing cylinder. Or, to restate the matter, it can pick up a shock instantly and feed it out gradually into the threshing cylinder.

As stated above, I am aware that many attempts have been made to pick up shocks of grain and thresh it with the combined harvester; I therefore do not claim such devices broadly, but I do claim the improvements in such machines as prescribed in the following claims.

I claim:

1. A pick-up feeder for harvesters having in combination a bundle pick-up conveyor, a main draper normal to said pick-up conveyor upon which said conveyor can deposit a shock of bundles, a retarding means opposing said main draper for placing the bundles in extended order, and means for cutting the bands from said bundles.

2. A pick-up feeder for harvesters having in combination a bundle pick-up conveyor, a main draper normal to said pick-up conveyor upon which said conveyor can deposit a shock of bundles, a revolving retarding means opposing said main draper for placing the bundles in extended order, a comber above said main draper for arranging the bundles longitudinally with said draper by moving with and faster than said draper, and means for cutting the bands from said bundles.

3. A pick-up feeder for harvesters having in combination a bundle pick-up conveyor, a main draper normal to said pick-up conveyor upon which said conveyor can deposit a shock of bundles, a spoked retarding means opposing said main draper for placing the bundles in extended order, a comber above said main draper working in unison therewith for arranging the bundles longitudinally with said draper, means for cutting the bands from said bundles, and a straw straightening cylinder through which all of the straw from the open bundles must pass before reaching the threshing cylinder.

4. A pick-up feeder for harvesters having in combination a bundle pick-up conveyor, a main draper normal to said pick-up conveyor upon which said conveyor can deposit a shock of bundles, a spoked retarding means opposing said main draper for placing the bundles in extended order, an inclined draper for receiving combed straightened bundles from said main draper and carrying same toward the threshing cylinder, and means for cutting the bands from said bundles.

5. A pick-up conveyor for harvesting machines having in combination a frame adapted to be extended laterally from a combined harvesting machine; a horizontal main draper mounted on said frame; a pick-up conveyor projecting forwardly from said frame and adapted to pick up a shock of bundles and deposit same on said main draper; a bundle retarding means mounted across said main draper adapted to arrange bundles in extended order on said main draper; a bundle comber over said main draper adapted to arrange said extended bundles longitudinally with relation to said main draper; an inclined draper adapted to receive said longitudinally arranged bundles from said main draper; and bundle cutters over said inclined draper.

6. A pick-up conveyor for combined harvesters having in combination a frame adapted to be carried by and extending laterally from a combined harvester; a forwardly projecting bundle pick-up conveyor having spiked flights thereon whereby a shock of bundles can be picked up as the combine advances; a horizontal main draper on said frame having one end under the discharge of said bundle pick-up conveyor; a bundle retarding device opposing said main draper whereby a shock of bundles can be placed in extended order on said main draper; a bundle comber for placing said extended bundles longitudinally with relation to said main draper and moving in the same direction; and means for operating said extending and combing devices independently of said conveyor and draper.

7. A pick-up feeder for harvesters having, in combination, a conveyor for picking up shocks of grain as the harvester advances; a draper for carrying the bundles toward the harvesting machine; and means for placing the bundles in extended order on said draper with the straw thereof lying longitudinally with said draper.

8. In a pick-up feeder for combined harvesters, the combination of a main draper adapted to carry bundles toward the harvesting machine; a bundle retarder adapted to partially resist the movement of bundles along said draper; a combing device mounted across said draper adapted to assist the movement of and to arrange the bundles longitudinally with the draper; and bundle cutting knives in the path of the bundles as they come from said comber.

9. A harvesting machine having, in combination, a threshing cylinder; a main draper for moving bundles toward said cylinder; an inclined draper between said main draper and threshing cylinder and having a straw straightener in front of said threshing cylinder; a frame for supporting said main draper; a bundle pick-up conveyor projecting forwardly from said combine and depositing its bundles upon said main draper; a bundle retarding cylinder over said main draper opposing the movement of said draper adapted to prevent the bunching of bundles on the main draper; and means for controlling the speed of said draper with relation to the speed of the threshing cylinder.

NELSON D. PARKS.